Sept. 10, 1946.  J. M. WILSON  2,407,361
TEMPERATURE MEASURING SYSTEM
Filed July 28, 1943
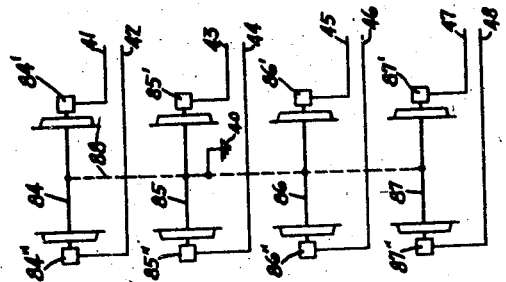
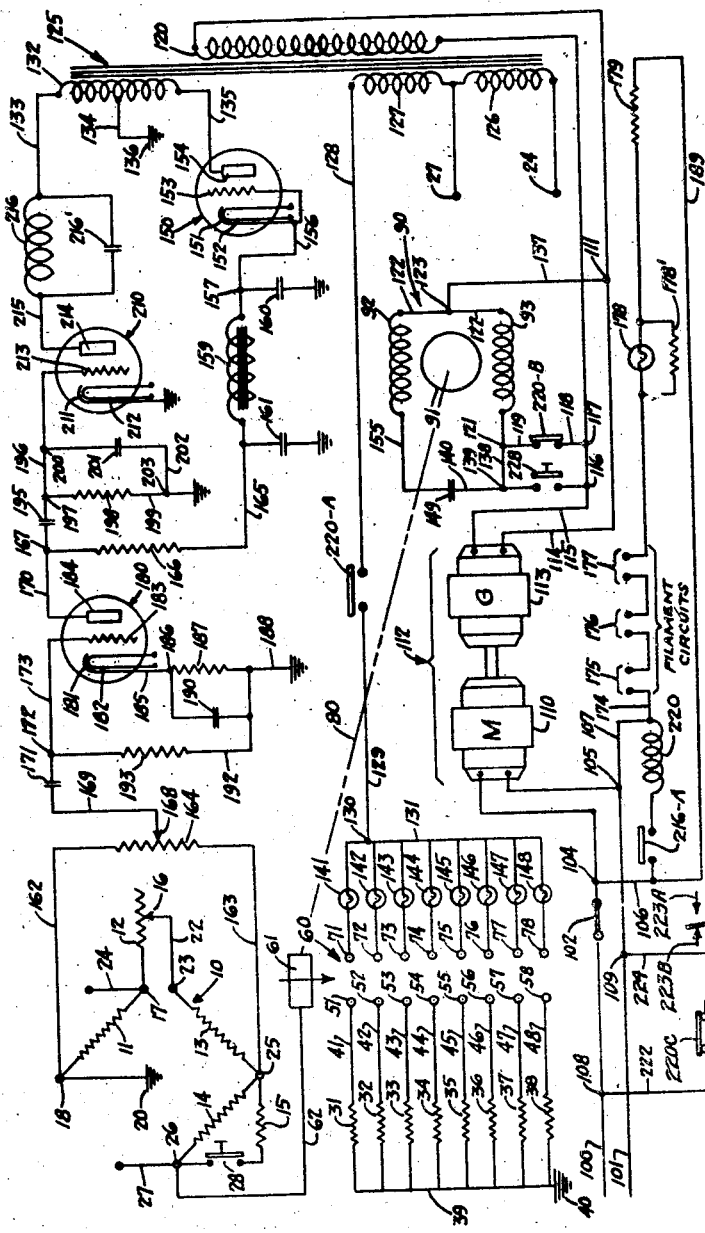
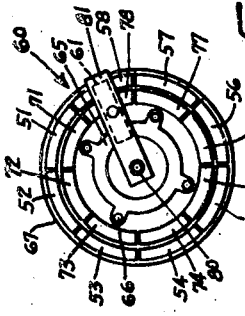
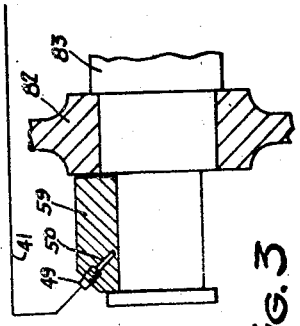
INVENTOR
JOHN M. WILSON
BY *George H. Fisher*
ATTORNEY Patented Sept. 10, 1946

2,407,361

UNITED STATES PATENT OFFICE 2,407,361

TEMPERATURE MEASURING SYSTEM

John M. Wilson, Minneapolis, Minn., assignor to Minneapolis-Honeywell Regulator Company, Minneapolis, Minn., a corporation of Delaware Application July 28, 1943, Serial No. 496,518

11 Claims. (Cl. 177—311)

This invention relates to electrical signalling and controlling circuits for indicating or controlling at a remote central point conditions prevailing at a plurality of widely separated points, and more specifically to electrical signalling and control apparatus for remotely indicating the temperatures or other conditions prevailing at a plurality of separate bearings of machinery, locomotives and the like. The invention has especial utility for centrally indicating when the temperature of any one of a plurality of bearings exceeds a maximum operating temperature, for example when the wheel bearings of a locomotive reach or exceed the permissible operating temperatures. It has been found in respect to Diesel and other locomotives that the rise in temperature beyond the permissible operating temperature is likely to occur rapidly and that in order to prevent failure of the bearings and possible disastrous results it is desirable to have a continuous check on the temperature of the bearings.

It is an object of the invention to provide a signalling and control apparatus for remotely indicating at a central point the existence of an abnormal condition at any one of a plurality of separated points, it being a more particular object of the invention to provide a signalling and control apparatus for remotely indicating the temperature of bearings of operating machinery, particularly locomotives.

It is a further object of the invention to provide a signalling and control system utilizing a resistance bridge wherein one element of the bridge is a remotely located resistance element located at the position where an operating condition is to be indicated and to utilize a change in the output voltage of said bridge for the operation of signalling and control apparatus.

It is a further object of the invention to provide an apparatus for successively and sequentially connecting resistance elements in a resistance bridge circuit and to utilize the bridge output for controlling the operation of signalling and control apparatus.

Other objects of the invention will appear as the description proceeds and will be found in the appended claims.

The invention is illustrated with reference to the drawing in which,

Figure 1 is a wiring diagram of the apparatus;

Figure 2 is a schematic view illustrating the method of installation in respect to locomotive wheel bearings;

Figure 3 is an elevational view illustrating the mode of installation of a typical responsive element in the wheel bearing of a locomotive, and Figure 4 is a plan view of a portion of a selector switch utilized in the invention.

Throughout the drawing, corresponding numerals indicate corresponding parts.

Referring to the drawing, Figure 1 illustrates the wiring diagram of the invention wherein there is provided a resistance or impedance bridge generally designated 10 composed of a plurality of resistances or impedances 11, 12, 13, 14, and 15, and any one of a plurality of resistance or impedance elements 31—38. These elements will hereinafter be referred to as resistance elements, but it is to be understood that they may if desired be other types of impedance elements in certain modes of application of the invention.

Resistance element 11 is connected between junction 17 and junction 18, the latter being grounded at 20. To junction 17 there is connected one terminal of resistance 12, which is preferably made variable by means of tap 16, the tap 16 being connected by lead wire 22 to junction 23. From junction 17 there extends a power input connection designated 24. Resistance element 13 is connected between junctions 23 and 25, the latter junction being one of the bridge output terminals, the other bridge output terminal being junction 18. Resistance element 14 is connected between junction 25 and junction 26, and to the latter there is connected a second power input connection 27. One terminal of resistance 15 is connected to junction 25 and, through a manually operated switch 28, to junction 26.

Resistance elements 11, 12 plus 13 and 14 (or 14 and 15 in parallel) constitute three elements of a resistance bridge, the fourth element being any one of the plurality of resistors 31 to 38, which may be located at selected remote points. The remotely located resistors serve to indicate the condition at the remote point, in accordance with the system of the present invention. In the illustrated embodiment of the invention provision is preferably made for sequentially and successively connecting said resistances 31 to 38 into the bridge circuit, although the resistances may be connected at random, if desired. It will be understood, of course, that there may be utilized a lesser or greater number of resistances 31—38 depending upon the number of remote points, the conditions at which it is desired to be indicated by the apparatus.

One end of each of resistances 31—38 is connected to a common ground wire 39, the latter being conveniently grounded to the frame of the machine or other suitable connection at 40.

Where it is desired to utilize the invention for indicating temperatures the resistances 31—38 may be constructed of a material having a high coefficient of resistance so that as the temperature varies at the point of installation of any one of the resistances 31—38, a corresponding variation will occur in the ohmic or impedance value of the resistance. It will of course be appreciated that the resistance elements 31—38 may be made responsive to any desired function such as pressure, humidity, gas analysis, or the like by utilizing a suitable responsive element coupled to the resistance (or impedance) element.

The other ends of the resistances 31—38 are connected by lead wires 41—48, respectively, to a plurality of contacts 51—58 of a sequence switch generally designated 60. The sequence switch may be of any suitable design and is provided with a movable contact (or cam) arrangement 61 for establishing connection successively and sequentially with contacts 51—58. The movable contact 61 is connected through contact 65 (Figure 4) and thru lead wire 62 to junction 26 of the bridge. Since junction 18, and each of the resistances 31—38, are grounded the successive engagement of movable contact 61 with each of the stationary contacts 51—58 will cause resistances 31—38 to be connected successively across the terminals 18 and 26 of the bridge, thus completing the bridge circuit.

A suitable and desirable form of sequence switch is illustrated in Figure 4, wherein the contacts 51—58 are shown as arranged in a circle as a plurality of arcuate segments. Within the circle of contacts 51—58 there is arranged a second circle of contacts 71—78 for a purpose to be explained, and there is positioned a central solid circular contact 65 which is fastened in place by suitable rivets or screws 66. The entire arrangement may, if desired be made by utilizing a plastic insulating base 67 into which there is first molded the central contact 65 and two solid circular rings of contact material, which are later cut into segments so as to form the contacts 51—58 in an outer circle and contacts 71—78 in the intermediate circle. At the center of the insulating block 67 there extends a shaft 80 upon which there is mounted an insulated arm 81 carrying on its underside the resiliently mounted bridge contact 61 illustrated in Figure 1. Thus as the shaft 80 rotates it carries with it arm 81 and consequently causes the bridge contact 61 successively to establish circuit between the central continuous contact 65 and the contacts 51 and 71 or 52 and 72 etc. The shaft is caused to rotate continuously. The central contact ring 65 is connected to wire 62 and in effect serves as a continuous connection to the bridge contact 61, as illustrated in Figure 1.

For the rotation of shaft 80 there is provided a motor generally designated 90, having a rotor 91 and stationary windings 92 and 93. The rotor is mounted on shaft 80, illustrated by dotted lines in Figure 1. The shaft, as previously mentioned, carries the arm 81, and the latter in turn carries the resiliently mounted sequence switch 61. A suitable gearing may be interposed between the motor 90 and shaft 80 so as to permit either a slow or rapid operation of the shaft 80 and arm 81, as desired. For indicating the temperature of bearings of a locomotive or similar large piece of machine it is usually sufficient to cause complete rotation of shaft 80 and arm 81 every 1 or 2 minutes, thus providing, as hereinafter explained, a complete check, every 1 or 2 minutes.

The power supply for the system may be either direct or alternating current of any available voltage and is communicated to the system by means of supply lines 100 and 101. A main switch is provided at 102 for shutting down the system whenever desired. Lines 100 and 101 are connected through junctions 104 and 105 to the motor 110 of a motor generator set generally designated 112. The generator indicated at 113 supplies alternating current at an appropriate voltage to supply lines 114 and 115, extending to the primary winding 120 of an alternating current transformer generally designated 125.

The transformer 125 is provided with a secondary winding 126 terminating in taps 24 and 27, these being connected to the correspondingly numbered lines of the resistance bridge by suitable connections not shown in the drawing. It will thus be observed that the transformer secondary 126 provides alternating current potential across the bridge terminals junctions 17 and 26 and current accordingly flows in the bridge through two parallel circuits as follows:

The first of the parallel bridge circuits is from transformer secondary 126 via line 24 to junction 17, and through bridge resistance 12, variable tap 16, line 22, junction 23, resistance 13, junction 25, and then through resistance 14 (or during testing, through resistance 14 in parallel with resistance 15 and switch 28), to junction 26 and thence through line 27 to the transformer secondary 126. The second of the parallel bridge circuits is from the transformer secondary 126 through line 24 to junction 17 and thence through resistance 11, junction 18, ground 20, to ground 40 (of resistances 31–38), thence through any one of the resistance elements 31—38 (and its corresponding line 41—48) to the corresponding terminals 51—58, thence through the sequence switch elements 61 and continuous contact 65 to line 62, then to junction 26, and through line 27 to the corresponding terminal 27 of the transformer secondary 126. Alternating current thus flows through the resistance elements of the bridge and an electrical potential difference is established between junction 18 and 25 depending upon the relative sizes of the resistance elements constituting the bridge.

The resistance constituting the bridge circuits are chosen of such values that normally a predetermined voltage relation is established between junctions 18 and 25. When the magnitude of a particular resistance 31—38 of the bridge circuit is increased, due to any causative factor, the proportionality of the bridge will be disturbed such that the voltage across junctions 18 and 25 is reduced, and as the value of resistance element 31—38 increases still farther, the voltage across junctions 18 and 25 is further reduced.

The transformer 125 is provided with another secondary 127 terminating at taps 27 and 128, the latter being connected through relay contact 220—A and line 129 to junction 130 on bus bar 131. The bus bar 131 serves as a common connection for a plurality of signal lamps 141—148, there being one signal lamp for each resistance 31—38. The opposite terminals of the signal lamps are connected, respectively, to contacts 71—78 of the sequence switch 60. It will thus be observed that a circuit is established beginning at tap 27 on transformer secondary winding 127, through a line (not illustrated) to the corresponding tap 27 of resistance bridge 10, thence through line 62, contacts 65 and 61 to any one of the contacts 71—78, of the sequence switch, thence through any one of the signal lamps 141—148, bus bar 131, junction 130, line 129, relays contact 220—A (which is normally open but closed under signalling conditions) and line 128 to the opposite terminal of the transformer secondary winding 127. It will thus be observed that as the sequence switch 60 is rotated potential circuits are established to signal lamps 141—148 and the lamps will be illuminated provided contact of relay 220—A happens to be closed.

The transformer 125 is provided with another secondary winding 132 having secondary terminal lead wires 133, 134, and 135, line 134 being grounded at 136. The portion of secondary 132 between lead wires 134 and 135 serves as the input to a rectifier tube 150 having a cathode 151, heating filament 152, a control grid 153 and plate 154, the control grid 153 and cathode 151 being connected together. The cathode heater filament 152 is connected in series with the heater filaments of other tubes, by circuits not completely illustrated, all as hereinafter explained.

The rectifier tube 150 serves to supply a halfwave rectified current to line 156 connected to cathode 151. Line 156 extends through junction 157 to one terminal of a filter inductance 159. Both terminals of the filter inductance 159 are connected through condensers to ground, there being two condensers 160 and 161 connected as indicated. The filter arrangement serves to smooth out the direct current potential applied to line 165 extending through resistor 166 to junction 167 of line 170.

From junctions 18 and 25, which are the output terminals of bridge 10, there extend lines 162 and 163 connected to the terminals of potentiometer resistance 164 of relatively high ohmic value. From variable tap 168 on resistance 164 there extends a lead 169 connecting through capacitor 171 to junction 172 and thence through line 173 to the grid 183 of an amplifier tube, generally designated 180. The amplifier tube 180 is provided with a cathode 181, indirectly heated by filament 182, and is provided with a plate 184 connected to line 170. From cathode 181 there extends lead wire 185 connecting, at junction 186, to resistor 187 and capacitance 190, both of these being grounded at 188. Grounded line 192 is connected to one terminal of a resistor 193, the opposite terminal of the resistor being connected to junction 172 of the grid connection 173.

Junction 167 in the plate circuit 170 constitutes the output of the amplifier tube 180 and is connected through capacitance 195 which is in turn connected through line 196 to the grid 213 of second stage amplifier tube, generally designated 210. From junction 197 on grid connection 196 there extends a resistor 198 which is grounded by line 199. A capacitance 201 parallels resistor 198, being connected to line 196 at junction 200, and grounded through line 202 to junction 203 on ground line 199. The amplifier tube 210 is provided with a cathode 211, indirectly heated by filament 212, and is also provided with a plate 214 connected through line 215 to one terminal of a relay coil 216, the opposite terminal of the relay being connected through line 133 to winding 132 on the transformer 125. A condenser 216' is connected in parallel with the relay coil 216.

Relay 216 is provided with a single operated contact 216—A which is closed when the relay 216 is energized. When resistances 31—38 are of normal value, tubes 180 and 210 are not conductive and relay 216 is therefore normally deenergized. As a result, contact 216—A of relay 216 is normally open. The relay contact 216—A is in a circuit extending from junction 104 on power supply line 100 through branch 106, relay contact 216—A, the coil 220 of a second relay and through branch 107 to junction 105 of supply line 101. Thus when relay 216 is energized, as occurs when resistances 31—38 are abnormally high, contact 216—A closes and establishes a circuit through the coil of relay winding 220.

Relay 220 is provided with three contacts 220—A, 220—B and 220—C. Contact 220—A is in the circuit of signal lamps 141—148 and illuminates one or another of these lamps when relay 220 is energized, and hence closes contact 220—A. Contact 220—B is normally closed (when relay coil 220 is deenergized) and establishes a circuit to motor 90 as follows: A first motor circuit at junction 117 on the feeder 115 of generator 113, the circuit extending through normally closed relay contact 220—B, connection 119 to junction 121, thence through winding 93, line 122, junction 123, line 137 to junction 111 on feeder 114, of generator 113. A second parallel circuit extends from feeder 115, through junction 117, line 118, normally closed contact 220—B of relay 220, line 119, junction 121, through line 138, junction 139, line 140, through a phase-shifting condenser 149, line 155, thence through winding 92 and line 122 to junction 123, and through line 137 to junction 111 on feeder 114. Accordingly, so long as relay 220 is de-energized, its contact 220—B remains closed and windings 92 and 93 are energized. When relay 216 is energized, its contact 216—A is closed, relay 220 becomes energized, opens contact 220—B and interrupts the circuits to motor 90 thus stopping the sequence switch. The condenser 149 serves to shift the phase of the current flowing through winding 92 of motor 90 and accordingly there is provided the necessary rotating field requisite to the operation of a squirrel-cage rotor 10' of motor 90.

All of the heating filaments of the several tubes, viz. rectifier tube 150 and amplifier tubes 180 and 210 are connected in a series circuit extending from power supply line 101 through branch 107, thence through line 174 through pairs of terminals 175, 176, 177, in series, which are connected to the three filaments of the three tubes, thence through a pilot light 178 and voltage limiting resistor 179 and lines 189 and 106 to terminal 104 on power supply line 100. If desired a bypass resistor 178' may be included in parallel with pilot lamp 178 so that a standard filament lamp may be used in the circuit and at the same time sufficient current drawn to permit suitable heating of the filaments of the tubes. It will be understood that the terminals 175 are connected to the filament leads of rectifier tube 150, that the pair of terminals 176 are connected to the filament leads of amplifier tube 180, and that the terminals of amplifier 177 are connected to the filament leads of amplifier tube 210. Accordingly, whenever switch 102 is closed current will flow from line 101 through 107, thence through the filaments 152 of rectifier tube 150, filament 182 of amplifier tube 180, and filament 212 of amplifier tube 210 and thence through line 174 and pilot light 178, resistor 179, lines 189 and 106 to line 100. Resistor 179 is likewise used in series with the filaments, in order that standard voltage filaments may be used. Obviously, the use of special filaments or tubes 150, 180, 210 and in lamp 178, would obviate the need for resistances 178' and 179.

In parallel with contacts 220—B of relay 220 there is provided a manually operated switch 228 which is mechanically coupled to switch 28 in circuit with resistance 15 of the resistance bridge, so that switches 28 and 228 are closed simultaneously for testing the system, as hereinafter explained.

Relay 220 is also provided with a contact 220—C which is closed when relay 220 is de-energized, this switch being in a circuit extending from junction 108 on supply line 100 through line 222, relay contact 220—C, a relay coil 223 and line 224 to junction 109 of power supply line 101. Normally energized relay coil 223 holds switch 223—A open and switch 223—B closed. Switch 223—B may control the locomotive so as to stop it upon opening of such switch while switch 223—A may operate a signal upon closing of such switch.

Referring to Figure 3 there is illustrated the manner in which the individual resistance elements 31—38 may conveniently be mounted on a typical bearing. In Figure 3 connection 41 (Figure 1) extends through a suitable conduit to the resistance element (one of the elements 31—38) which is preferably located in a metal container 49. The container has an extending end portion 50 and the entire resistance element in its housing is inserted into the bearing block by means of a suitable drilled and threaded or other mechanical connection. The resistance (31—38) is electrically insulated from the metal housing 50, except that one of its terminals is grounded to the housing so as to complete the circuit of the resistance element. The resistance is in complete thermal contact with the bearing block 59, the temperature of which is desired to be indicated and registered by the apparatus of the invention. Figure 3 schematically illustrates a railroad locomotive wheel 82 mounted upon an axle 83 in the usual manner. The bearing block or "brass" 59 is positioned upon the axle in accordance with standard practice.

In Figure 2 there is schematically illustrated the manner in which the invention is applied to a typical machine, for example a locomotive. In Figure 2 there are illustrated four wheel and axle assemblies of a locomotive these being numbered 84, 85, 86, 87. In the actual locomotive the wheel and axle assemblies are electrically connected together by the locomotive frame as indicated by the dotted line 88, and the frame is grounded at 40, this being in an electrical sense, the ground 40 of Figure 1. The journal blocks are indicated at 84', 84'', 85', 85'', 86', 86'', 87', 87'' and each journal is provided with one of the resistance elements 31 through 38 of Figure 1, these being suitably attached as in Figure 3. It will be understood that one of the resistance elements 31—38 is placed in each wheel bearing. Obviously for locomotives or other machinery having a greater or lesser number of bearings, it is only necessary to provide an equal number of resistance elements of the type shown at 31—38 in Figure 1, and in some instances several resistance elements may be used in a very large journal, where a temperature difference may exist between parts of the journal. In all instances, of course, the selector switch 60 would have a number of contacts equal to the number of resistance elements in the system.

Operation

In order to place the apparatus in service switch 102 is closed (as shown) which accordingly furnishes power to the motor 110 of the motor-generator set designated 112. A circuit is also established through the pilot light 178 and through the heating filaments of the rectifier and amplifier tubes as heretofore described. The generator 113 provides alternating current of an appropriate voltage to the primary 120 of the transformer 125 and by means of secondary 126, voltage is impressed across terminals 17 and 26 of the resistance bridge. The resistances are proportioned so that when resistances 31—38 have a normal temperature and hence normal ohmic value, the voltage across potentiometer 164 will yield an appropriate voltage on grid 183 of amplifier tube 180, and under such condition the amplifier tubes 180 and 210 are not conductive. As a result relay 216 is not energized and contact 216—A remains open.

Relay 220 is controlled by contact 216—A of relay 216 and is accordingly de-energized and maintains its contact 220—A open and contacts 220—C and 220—B closed. Relay coil 223 is therefore energized, the locomotive may run and the signal is not operating. As a result the alternating current supplied by generator 113 is applied from line 115 through contact 220—B of the two windings 92 and 93 of the motor 10, thus causing the continuous operation of motor 90 and consequent continuous operation of switch 60. During the existence of this condition the signal lamps 141—148 are not illuminated, because their operating circuit is interrupted by the open contact 220—A of relay 220.

The foregoing conditions continue until, due to increase of the temperature of one of the journals the ohmic value of some one of resistances 31—38 also increases. When this occurs, the voltage at tap 168 changes. Thus, for example, where the resistances 31—38 are used to indicate bearing temperatures, so long as the temperature of each bearing remains below a predetermined value the voltage applied to grid 183 is such as to prevent operative energization of relay coil 216. Upon increase in bearing temperature and consequent increase in the ohmic value of its associated resistance, the voltage applied to grid 183 finally becomes such that relay 216 is energized and closes contact 216—A. This energizes relay 220.

As a result of the energization of relay 220 contact 220—B is opened, thus interrupting the circuit of motor 90, which accordingly stops quickly in a position such that contact 61 of selector switch 60 is on the particular contacts 51—58 and 71—78, corresponding to the offending resistance 31—38, the value of which had been increased by an increase in the temperature of its bearing. With the motor 90 stopped and relay 220 energized contact 220—A is closed, thus establishing a circuit from winding 127 of the transformer through line 128, then closed contact 220—A and bus bar 131, through the particular pilot lamp 141—148 corresponding to the offending resistor 31—38 and its contact and thence through contact 61 of the selector switch and line 62 to terminal 27 of the bridge, which is connected by a lead wire not illustrated to terminal 27 of the transformer secondary 127. The pilot lamp corresponding to the offending resistor 31—38 is accordingly lighted. At the same time contact 220—C is opened and relay 223 is de-energized whereby the signal or control circuit is completed through switch 223—A thereby performing the desired function in such circuit. The switch 223—B may, as explained above, be used to stop the locomotive.

In the event one of the resistors 31—38, or any portion of their respective circuits, becomes open circuited, this will in effect increase the value of the resistance or resistances 31—38 to infinite value, and the effect will be to stop motor 90 and illuminate the corresponding pilot lamp 141—148, in the same manner as occurs when the value of the resistances 31—38 is increased due to an increased temperature. Therefore such an open circuit condition is automatically indicated by the apparatus.

If any one of the resistances 31—38 becomes short circuited or any other factors occur which in effect lowers the resistance value of such portions of the resistors or their circuits, this will produce a further unbalance of the bridge in the direction normally maintained, and as a result the motor 90 and signal lamps will not automatically be operated to indicate the low resistance fault. In order to test for such low resistance or short-circuit types of faults, test switches 28 and 228 (which are connected together) are manually closed. Closure of switch 28 places resistance 15 in parallel with resistance 14. The value of resistance 15 is relatively low so that the resulting resistance of resistances 14 and 15 in parallel is sufficiently low that any unbroken or unshorted one of the resistances 31—38, when connected in the bridge circuit, will apply voltage to grid 183 at a normal journal bearing temperature such as to indicate that the journal bearing temperature is too hot. Stated in another way, the effect of closing switch 28 is to lower the temperature setting of each of the resistances 31 to 38 so that each of them, unless short circuited, causes relay 216 to be energized and the proper pilot light to be lighted. The simultaneous closing of switch 228 provides constant energization for motor 90 so that it does not stop upon energization of relay 216. In this manner each of the resistances 31—38 may be checked sequentially. If one of these resistances should be short circuited or its resistance is below some predetermined value as dictated by the value of resistance 15, then, the voltage impressed on grid 183 will be of the same order as though such resistance were normal, the temperature was normal, and switch 28 was open. Such short circuited resistance will therefore fail to energize relay 216 and its associated pilot light will not become lighted thereby indicating the short circuit.

Summing up then, upon a dangerous temperature being established at any bearing of the locomotive, its associated resistance element has its resistance increased causing the motor 90 to stop and an appropriate signal light indicating which bearing is overheated to be lighted. At the same time, through switch 220—C, relay 223, and switch 223—A an audible signal may be operated. Switch 223—B may be utilized to stop the locomotive. A burned out resistance will cause an increase in resistance just as a temperature rise and the system thereby checks for a burned out resistance. In addition, the apparatus may be tested or checked by closing switches 28 and 228. In this checking operation each pilot light will be lighted provided its associated resistance has not been short circuited below a predetermined resistance. Likewise, if the pilot light itself should be burned out, it will not light and will be an indication that there has been a failure of some type in the system.

While the present invention has particular utility in checking successively the temperatures of bearings in a locomotive or other railway car, it is obvious that it likewise has utility for indicating conditions other than temperature as well as for control purposes. It is also clear that many changes may be made without departing from the spirit of my invention and I therefore intend to be limited only by the scope of the claims appended hereto.

I claim as my invention:

1. The combination comprising a plurality of separately located resistances each having a normal value, said resistances being constructed of a material having an appreciable temperature coefficient of resistance, a resistance bridge circuit composed of a plurality of resistors and said separately located resistances, sequence switch means for successively connecting said remotely located resistances in said resistance bridge circuit including motor means for operating said sequence switch means, a power supply for said motor means, relay means for controlling the connection of said motor means to said power supply, an amplifier having its input connected to said resistance bridge circuit and its output connected to said relay means, said amplifier being adjusted so as to cause the operation of said relay means to stop the motor when the sequence switch driven by the motor has connected to the bridge circuit one of the separately located resistances having an appreciably increased resistance, a plurality of signal means, one corresponding to each separately located resistance, and a set of contacts in said sequence switch for successively connecting said signal means in a suitable circuit.

2. The combination comprising a plurality of separately located resistances each having a normal value, said resistances being constructed of a material having an appreciable temperature coefficient of resistance, a resistance bridge circuit composed of a plurality of resistors and said separately located resistances, sequence switch means for successively connecting said remotely located resistances in said resistance bridge circuit including motor means for operating said sequence switch means, a power supply for said motor means, relay means for controlling the connection of said motor means to said power supply, an amplifier having its input connected to said resistance bridge circuit and its output connected to said relay means, said amplifier being adjusted so as to cause the operation of said relay means to stop the motor when the sequence switch driven by the motor has connected to the bridge circuit one of the separately located resistances having an appreciably increased resistance, a plurality of signal devices, one corresponding to each separately located resistance, a set of contacts on said selector switch, there being one contact for each signal device for preparing a circuit therethrough, and means operable coincidental with the stopping of said sequence switch drive motor for completing said signal device circuit.

3. In a measuring apparatus, a plurality of measuring devices for measuring an undesirable condition, a mechanism to be actuated thereby upon the occurrence of an undesirable condition, means for recurrently connecting and disconnecting each of said devices to said mechanism to cause actuation of said mechanism upon the occurrence of an undesirable condition at any one of said devices, and means associated with said devices and mechanism for effectively lowering the value of said undesirable condition for causing actuation of said mechanism by each of said devices even though an actual undesirable condition does not exist, whereby the operativeness of said measuring apparatus may be checked.

4. In combination, an electrical apparatus adapted to be operated when connected to a predetermined electrical resistance value, a resistance means connected to said apparatus and normally having a value other than said predetermined value, a test resistance, and means for connecting said test resistance to said resistance means, said test resistance having such value that the resistance means and test resistance together subject said electrical apparatus to said predetermined resistance value to operate the same when said resistance means is at said normal value, but do not subject said electrical apparatus to said predetermined resistance value if said resistance means is at a value considerably lower than said normal value.

5. In a device of the character described, in combination, a motor driven switch means having a plurality of pairs of contacts and a contactor sequentially movable over said contacts a pair at a time, one contact of each of said pairs being arranged for connection to a remote temperature responsive impedance, said contactor being connected to means capable of giving an electrical response indicative of the impedance value of each impedance connected to said switch means, means for amplifying such a response, relay means capable of actuation when said amplified response is of a predetermined value, and a plurality of signal means, the other contacts of each of said pairs being individually connected to said signal means, said relay controlling the energization of the motor of said motor driven switch means and the energizing means for each of said signal means in such manner that, upon an indication of an unduly high impedance value, the motor driven switch is stopped and a signal means is energized to indicate on which pair of contacts the contactor has stopped.

6. In a device of the character described, in combination, a motor driven switch means having a plurality of pairs of contacts and a contactor sequentially movable over said contacts a pair at a time, one contact of each of said pairs being arranged for connection to a remote temperature responsive impedance, said contactor being connected to means capable of giving an electrical response indicative of the impedance value of each impedance connected to said switch means, means for amplifying such a response, relay means capable of actuation when said amplified response is of a predetermined value, a plurality of signal means, the other contacts of each of said pairs being individually connected to visual signal means, and an audible signal means, said relay controlling the energization of the motor of said motor driven switch and the energizing means for said signal means in such manner that, upon an indication of an unduly high impedance value, the motor driven switch is stopped, the visual signal means is energized to indicate on which pair of contacts the contactor has stopped and the audible signal means is sounded.

7. In a journal bearing alarm system for a vehicle having a plurality of journal bearings, a temperature sensitive resistor means associated with each of said bearings and responsive to the temperature of same, a partial electrical bridge network capable of being completed by any one of said resistors, a motor driven sequence switch having a pair of contacts for each of said resistors, each of said resistors being connected to one contact of each of said pairs, the other contact of each of said pairs being connected to an individual signal means, said switch means including a contactor driven by the switch motor and engaging said contacts a pair at a time, said switch means being capable of sequentially placing said resistors into and out of said network so that said bridge network is sequentially completed by each of said resistors, means supplying input current to said network, said network, when completed by a resistor, giving an electrical output indicative of the resistance of said resistor, means for amplifying said output, relay means controlled by said amplified output, second signal means, and means controlling the movement of the vehicle, said relay means, when actuated by an amplified output current of predetermined value, energizing said individual signal means, deenergizing said motor, energizing said second signal means and decreasing the movement of the vehicle.

8. In temperature indicating apparatus, in combination, a plurality of temperature responsive electrical means, electrical indicating means, power driven switch means for sequentially connecting said temperature responsive means in operative relation to said indicating means, said indicating means being capable of responding to a predetermined temperature at any one of said temperature responsive means in a given manner, and test means for electrically modifying said indicating means so that said indicating means will respond in said given manner when the temperature at said one means is at a normal value different from said predetermined temperature.

9. In an indicating apparatus arranged to be connected to a plurality of temperature responsive resistors having substantially similar characteristics comprising, in combination, an incomplete electrical network, motor driven switch means for sequentially connecting said resistors into said network, electrical means responsive to the degree of balance of said network for stopping the operation of said motor driven switch means and providing a given indication when a resistor responding to an abnormal temperature is connected into said network, and manually operated testing means including a circuit for altering the balance of said network so that said given indication will result from the connection into the network of a resistor responding to a lower temperature, said testing means also causing operation of said motor driven switch means.

10. A railway vehicle having a plurality of journal bearings, a temperature responsive resistance unit mounted in close thermal communication with each bearing, a plural element partially completed electrical network circuit, a motor driven sequence switch for successively connecting said resistance units to the network circuit to complete said circuit, relay means, an amplifier means having its input connected to the network circuit and its output connected to said relay means, signal means corresponding to each resistance unit, contact means operated by said sequence switch for preparing a circuit to the signal means corresponding to a particular resistance unit when said unit is connected to said network by said sequence switch, said relay means interrupting the circuit to said sequence switch motor and completing the circuit to said signal means when the said unit connected into said network circuit has a resistance indicative of a relative high temperature.

11. In a device of the character described, in combination, a plurality of switching means, means including a motor for operating said switching means in sequence a pair at a time, one of each of said pairs being arranged for connecting a remote temperature responsive impedance to means capable of giving an electrical response indicative of the impedance value of the said impedance, means for amplifying such a response, relay means capable of actuation when said amplified response is of a predetermined value, and a plurality of signal means, the other one of each of said pairs of switching means being individually connected to said signal means, said relay means controlling the energization of the motor of said motor operated switching means and the energizing means for each of said signal means in such manner that, upon an indication of an unduly high impedance value, the motor operated switching means is stopped and a signal means is energized to indicate at which pair the switching means has stopped.

JOHN M. WILSON.